US 6,581,478 B2

(12) United States Patent
Pahl et al.

(10) Patent No.: US 6,581,478 B2
(45) Date of Patent: Jun. 24, 2003

(54) TORQUE MEASURING APPARATUS AND METHOD EMPLOYING A CRYSTAL OSCILLATOR

(75) Inventors: Birger Pahl, Milwaukee, WI (US); James E. Hansen, Oak Creek, WI (US); Matthew F. Planning, Milwaukee, WI (US); Robert H. Mathews, Decatur, IN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/898,817

(22) Filed: Jul. 5, 2001

(65) Prior Publication Data

US 2003/0005780 A1 Jan. 9, 2003

(51) Int. Cl.[7] .............................. G01L 3/02; G01L 3/00
(52) U.S. Cl. ............................ 73/862.326; 73/862.325; 73/862.08; 73/DIG. 4
(58) Field of Search ...................... 73/862.326, 862.32, 73/862.325, 862.323, 862.08, 862.68, 862.59, DIG. 4, 862.41

(56) References Cited

U.S. PATENT DOCUMENTS 4,364,046 A * 12/1982 Ogasawara et al. ......... 324/661

5,585,571 A * 12/1996 Lonsdale et al. ...... 73/862.321

FOREIGN PATENT DOCUMENTS

| GB | 225854 A | * | 6/1990 | ............. G01L/3/00 |
| GB | 2225854 A | * | 6/1990 | ............. G01L/3/00 |
| JP | 2001272289 A | * | 10/2001 | ............. G01L/3/10 |

* cited by examiner

Primary Examiner—Hezron Williams
Assistant Examiner—Lilybett Martir
(74) Attorney, Agent, or Firm—George E. Haas; Quarles & Brady LLP

(57) ABSTRACT

Torque in a torsion member, such as a rotating shaft, is sensed by a piezoelectric element that is attached to the torsion member. The piezoelectric element has a resonant frequency that varies with changes in the torque and is part of a transducer oscillator that produces a first signal. A reference oscillator has a similar piezoelectric element and produces a second signal having a frequency that varies in response to environmental parameters. The first and second signals are heterodyned, thereby cancelling the effects due to environmental parameters acting on both piezoelectric elements and producing a resultant signal that has a frequency which corresponds to the torque applied to the torsion member.

19 Claims, 2 Drawing Sheets

TORQUE MEASURING APPARATUS AND METHOD EMPLOYING A CRYSTAL OSCILLATOR

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to apparatus for sensing torque applied to a torsion member, such as a shaft of a motor or a power transmission system.

2. Description of the Related Art

It often is desirable to measure the torque applied by a shaft or other type of torsion member. For example, in motor vehicles, a torque sensor is mounted on the shaft to which the steering wheel is attached in order to measure the amount of force that the driver is using to turn the wheels of the vehicle.

Heretofore, torque transducers often employed strain gauges mounted on the shaft to detect deflection of the shaft that resulted from application of torque. Strain gauges commonly are used to measure deflection of a structural member caused by forces acting on that member. The resistance of the Strain gauge changes upon being physically deformed. The electrical leads of the strain gauge are connected to a resistor bridge, such as a Wheatstone bridge, which produces an output signal that varies with variation of the torque applied to the shaft.

Another type of a torque sensor uses magneto-elastic elements fixedly positioned on the shaft and electromagnetic sensing coils that detects the change in the magnetic field as the magneto-elastic element is subjected to torsional strain. It was common to encounter difficulty in attaching the magneto-elastic elements to the shaft in a manner which would reliably convey the strain to the magneto elastic element. This was a drawback to mass production of such torque sensors.

Other force transducers employ a piezoelectric element mechanically fastened to the member in which the strain is to be detected. The piezoelectric element produces an electric charge output when the transducer is subjected to a high impulse load. Such a device, as described in U.S. Pat. No. 4,835,436 issued to H. S. Lew, is not well suited in applications where a low torsional strain rate, or a low magnitude torque is applied to the member. Thus this device is unsuitable for automotive steering shaft applications.

Therefore, it has long been desired to provide a way or means for sensing torsional strain in a member subjected to an applied torque in a manner that provides a high degree of sensitivity. Such a desire also involves the need to produce an electrical signal which indicates the torsional strain and which has a high resolution in response to changes in the torsional strain of the member. It has been sought to provide such a torque sensing mechanism which is immune from effects of environmental conditions, such as temperature and pressure variations.

SUMMARY OF THE INVENTION

These and other desires are satisfied by an apparatus for measuring torque in a torsion member, that apparatus includes a transducer adapted to be attached to the torsion member. The transducer has a piezoelectric element, such as a quartz crystal, that has a first resonant frequency ($f_{TRANSDUCER}$) which varies with variation of strain in the torsion member. A transducer oscillator is connected to the transducer and produces a first signal with frequency that is a function of the first resonant frequency. In the preferred embodiment of the present apparatus, the frequency of the first signal is a harmonic of the first resonant frequency.

A reference oscillator includes a reference piezoelectric element having a second resonant frequency ($f_{REFERENCE}$) The reference oscillator produces a second signal having a frequency that is a function of the second resonant frequency. A mixer is connected to the transducer oscillator and to the reference oscillator to heterodyne the first signal and the second signal thereby producing a resultant signal. In the preferred embodiment, the resultant signal is low pass filtered to remove frequency components other than the frequency difference between the first and second signals.

Because the resonant frequency of the transducer changes with the variation of the strain in the torsion member, the frequency of the first signal indicates the torque applied to the torsion member. However, the frequency of the first signal also may vary due to changes in temperature, pressure, age, and other environmental effects. To counter those effects, the reference piezoelectric element is provided that has a resonant frequency that varies with environmental effects in the same manner as the transducer. Therefore, mixing the first and second signals cancels the environmental effects and produces the resultant signal having a frequency that varies only as a function of the torque on the torsion member.

A novel mechanism for capacitively coupling the transducer on a rotating torsion member to the transducer oscillator also is described.

DETAILED DESCRIPTION OF THE INVENTION

Figure 1:
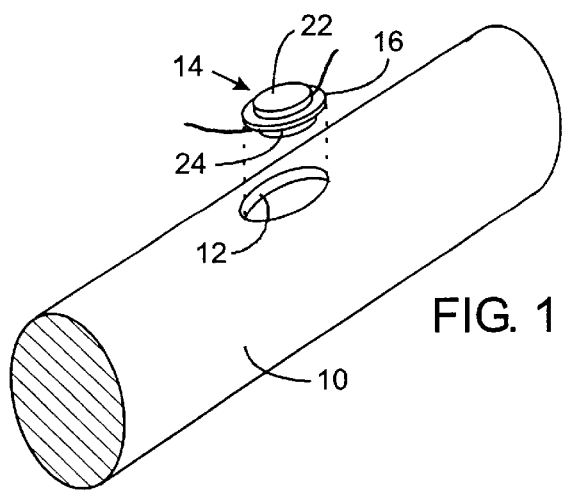
FIG. 1 is an isometric, exploded view of a transducer according to the present invention installed on a torsion member.

FIG. 1 illustrates a torsion member, such as shaft 10, of the type used in the steering column of an automobile to couple the driver's steering wheel to the linkage connected to the wheels. A hole 12 is bored radially into the circumferential surface of the shaft 10. The hole has a flat bottom surface that is orthogonal to the curved wall of the hole. A piezoelectric transducer 14 is placed into the hole.

Figure 2:
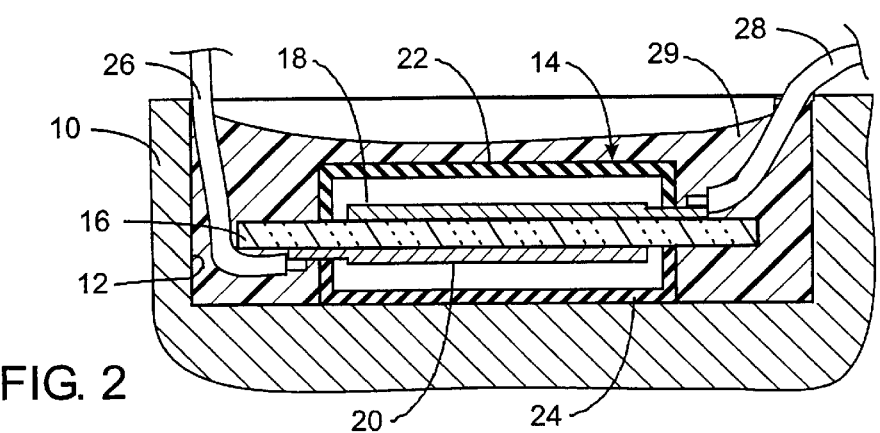
FIG. 2 is a cross-sectional view along a center line through the installed transducer of FIG. 1.

With reference to FIG. 2, the piezoelectric transducer 14 includes piezoelectric element in the form of a disk shaped quartz crystal 16 that preferably has an AT cut and a resonant frequency ($f_{TRANSDUCER}$) of five megahertz (MHz). The crystal 16 has two opposite faces on which a pair of electrodes 18 and 20 are formed by ion sputtering of an electrically conductive material, for example. It is preferred that the electrodes are made of gold or a gold alloy, but other suitable conductive materials may be used. A pair of resilient caps 22 and 24 are attached adhesively to each major surface of the piezoelectric crystal 16 covering electrodes 18 and 20. For example, the caps 22 and 24 can be formed of a silicon rubber with a very low modulus of elasticity so as not to interfere with the transfer of force from the shaft to the crystal. The caps are cylindrically shaped and have a diameter that is smaller than the diameter of the piezoelectric crystal 16, thereby leaving an outer annular ring of the crystal exposed. A portion of each electrode 18 and 20 extends outwardly from beneath the respective cap 22 and 24 and has an insulated wire 26 or 28 connected thereto.

The piezoelectric quartz crystal 16 has an axis of maximum strain sensitivity. When the transducer 14 is mounted in hole 12 that axis of maximum strain sensitivity is oriented at an angle of about 45 degrees to the longitudinal axis of the torsion member 10. The innermost cap 24 is adhesively attached to the bottom surface of the hole. Any suitable adhesive that will adhere to both the material of the cap and the rotating member may be used.

The hole 12 then is filled with potting material 29, such as an epoxy resin, which encapsulates the transducer 14 and further holds it in place. It will be understood that the circumferential edges of the piezoelectric crystal 12 are in direct contact with potting material 29 for force transmission there between and thus the epoxy resin upon hardening must be capable of efficiently transmitting those forces. The epoxy resin may be Bisphenol A resin with cyclohexylamine or hexahydrophthalic hardener type epoxy material having an upper service temperature limit of about 260° C. Those materials with a modulus of elasticity, preferably of at least $5.6 \times 10^8$ PA at 150° C. with a glass transition temperature preferably of at least 150° C. have been found to be satisfactory.

Figure 3:
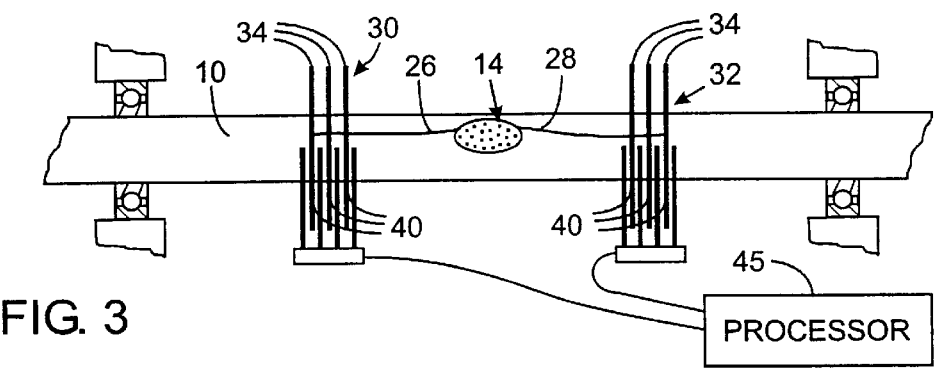
FIG. 3 is a view showing the coupling of electrical signals to the transducer on the rotating member.
Figure 4:
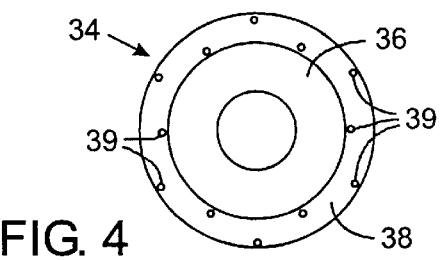
FIGS. 4 and 5 illustrate details of components of the a signal coupler in FIG. 3.

With reference to FIG. 3, the wires 26 and 28 from the transducer 14 are connected to a pair of capacitive couplers 30 and 32. Each coupler 30 and 32 comprises three disks 34 that are press fitted on the torsional member 10 in a spaced apart manner. As shown in FIG. 4, each of the disks 34 has a substrate 36 formed of an electrically insulating material of a type commonly used to form rigid printed circuit boards. An annular conductive region 38 is formed on the outer circumferential edge of both major surfaces of the substrate by conventional means, such as printing or plating. The two conductive regions 38 are interconnected by plated through holes 39 equidistantly spaced radially around the disk 34. The annular conductive regions 38 on disks 34 of a given capacitive coupler 30 or 32 are electrically connected to one of the transducer wires 26 or 28. The conductive regions 38 on each side of the disks 34 preferably are covered by a conventional solder mask which is a coating commonly used on printed circuit boards to insulate that electrical traces and prevent solder flow to undesirable areas. The effective capacitance of the coupler 26 or 28 depends on the particular solder mask which enables coupling of the radio frequency current at 15 MHz, for example, while insulating direct current.

Figure 5:
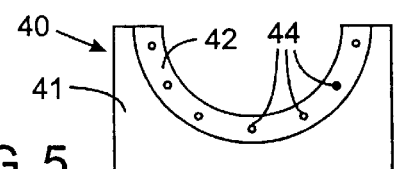

Referring again to FIG. 3, the three disks 34 of each coupling 30 and 32 are interleaved with four stationary plates 40. The gap between adjacent disks and stationary plates is as small as possible. Although three disks and four stationary plates are used in the exemplary transducer circuit, other numbers of those components can be employed to couple the rotating transducer to a signal processor 45. As shown in FIG. 5, each stationary plate has an insulating substrate 41 with a semi-circular conductor 42 on each major surface which are connected electrically by plated through holes 44. The outside surfaces of the outermost stationary plates of each capacitive coupler 30 and 32 do not require the semi-circular conductor 42, as those surfaces do not face a disk 34. The conductors 42 of the stationary plates 40 of a particular capacitive coupler 30 or 32 are electrically interconnected. In an assembled capacitive coupler 30 and 32, the annular conductive regions 38 of the disks 34 are adjacent to the semi-circular conductive patterns on the stationary plates 40 thus forming plates of a capacitor.

The stationary plates 40 of the capacitive couplers 30 and 32 are connected to the signal processor 45. Torque exerted on the torsion member 10 produces a twist which applies deflection strain to the transducer crystal 16 which produces corresponding changes the electrical characteristics of the crystal. The processor 45 comprises electronic circuitry that detects the change in electrical characteristics and generates an electrical signal indicative of the applied torque.

Figure 6:
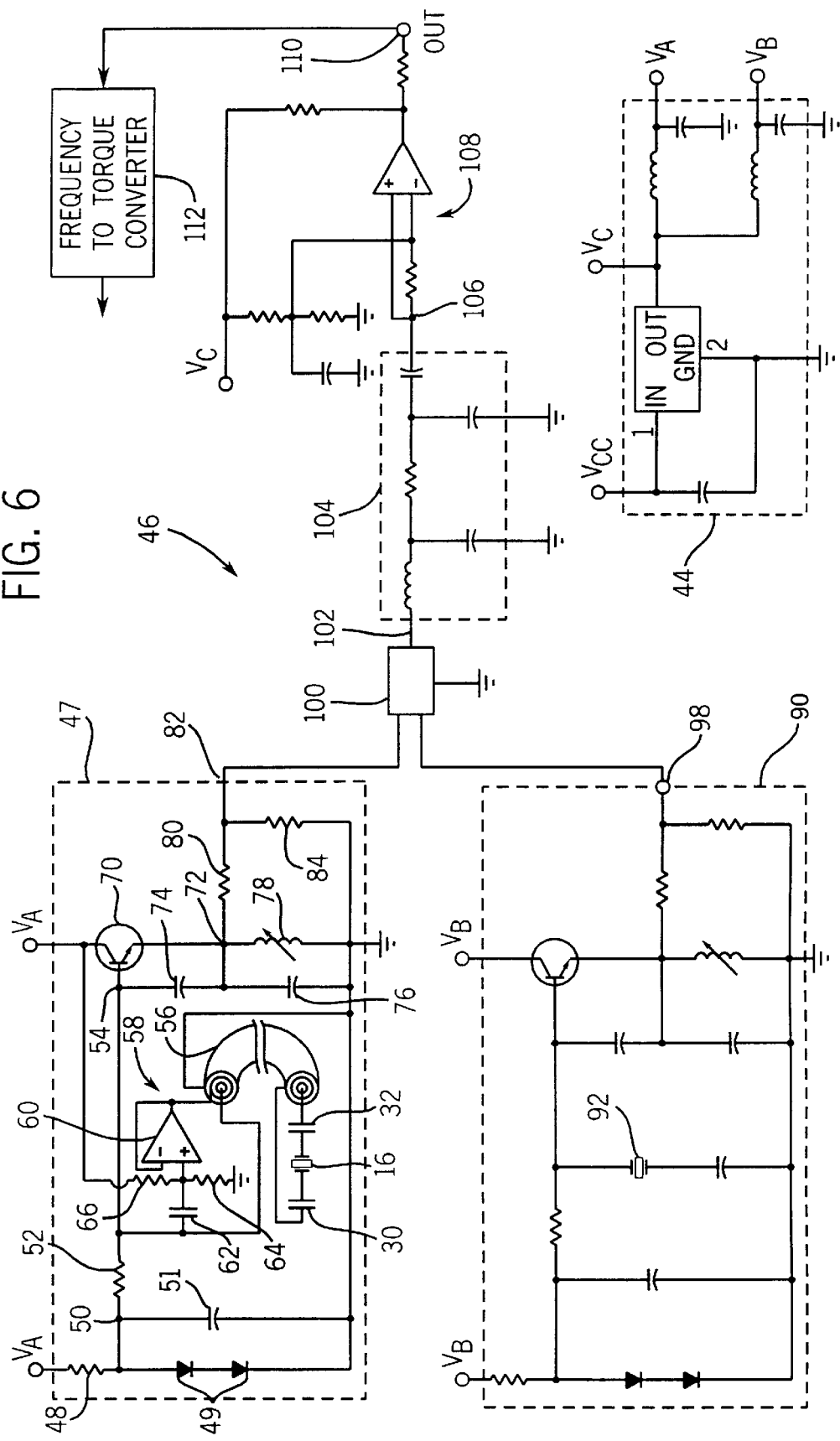
FIG. 6 is a schematic diagram of an electrical circuit that incorporates the transducer.

With reference to FIG. 6, the processor 45 includes an oscillator circuit 46 that includes a pair of Colpitts oscillators 47 and 90. The transducer 14 is connected to a transducer oscillator 47 which is tuned to the third harmonic of the resonant frequency of the crystal 16, in the preferred embodiment of the present invention. In that embodiment, the crystal has a resonant frequency of 5 MHz and thus has a third harmonic frequency of 15 MHz. However, one skilled in the art will appreciate that crystals with other resonant frequencies may be employed, and the transducer oscillator 47 can be tuned to the fundamental or another harmonic frequency of the crystal. In this application, the range of torque applied to the torsion member 10 causes the third harmonic frequency to vary in a range of ±6 kHz.

The transducer oscillator 47 receives a supply voltage $V_A$ from a regulated power supply 44 in the processor 45. A first resistor 48 couples the supply voltage to a first node 50 which in turn is coupled by a pair of diodes 49 to ground. An input capacitor 51 is connected in parallel with the pair of diodes 49. A second resistor 52 connects the first node 50 to a signal node 54. The signal node 54 in turn is coupled by the center conductor of a triaxial cable 56 to one of the capacitive couplers 34 connected to the transducer crystal 16. The center conductor of the triaxial cable 56 is surrounded by an inner shield and an outer shield extends around the inner shield. The other capacitive coupler 30 is connected to the outer shield of the triaxial cable 56. As will be described changes in the resonant frequency of the transducer crystal 16 varies the frequency at the signal node 54.

Sensing the change in electrical characteristics of the transducer crystal is extremely susceptible to capacitance variation of the wires connecting the transducer 14 to the oscillator circuit 46. Although capacitance changes can be reduced by minimizing the length of the electrical connection, people handling the cable and other environmental effects can adversely affect the circuit performance. As a consequence, a triaxial cable 56 is employed between the transducer oscillator 47 and the capacitive couplers 30 and 32 on the torsion member 10. The inner shield of the triaxial cable 56 is connected to a nulling circuit 58 which includes an operational amplifier 60 that serves as an active shield driver. The non-inverting input of the operational amplifier 60 is connected to the signal node 54 by a capacitor 62. A resistor 64 connects the non-inverting input to ground, and another resistor 66 connects the non-inverting input to the supply voltage $V_A$. The output of the operational amplifier 60 is connected directly to its inverting input and to the inner shield of triaxial cable 56. This circuit arrangement eliminates capacitance between the inner shield and ground. Therefore, a person touching the triaxial cable 56 does not affect the transducer signal. Specifically the signal applied to the inner shield of the triaxial cable 56 follows the crystal signal so that no effective capacitance exists between the center conductor and the shield.

The signal node 54 is connected to the base of a first NPN transistor 70 that has a collector-emitter conduction path coupled between the source of a supply voltage $V_A$ and an intermediate node 72 of the transducer oscillator 47. The intermediate node 72 is connected to the base of the first NPN transistor 70 by capacitor 74 and to ground by another capacitor 76. A variable tuning inductor 78 also couples the intermediate node 72 to ground. The intermediate node 72 is connected by resistor 80 to the output terminal 82 of the transducer oscillator 47 and a resistor 84 couples the output terminal 82 to circuit ground.

In applications where the effects of capacitance of the cable connecting the capacitive couplers 30 and 32 is not a significant concern, the couplers can be connected directly between the signal node 54 and ground without the need for a nulling circuit 58.

The processor oscillator circuit 46 also has a reference crystal oscillator 90. This latter oscillator 90 is similar to the transducer oscillator 47 except for the connection of a reference crystal 92, which is mounted on the printed circuit board of the reference oscillator 90. Specifically, the reference crystal 92 has physical characteristics that are closely matched to the crystal 16 used in the transducer 14. Thus, conditions, such as temperature, pressure and age, have identical effects on the resonant frequencies of both crystals. It is desirable that both crystals 16 and 92 be located relatively close to each other so as to be exposed to the same environmental conditions. Therefore, if a reference crystal 92 housed within the processor 45 will not be exposed to the same environmental conditions, the reference crystal may be remotely located adjacent to the torsion member The resonant frequency ($f_{REFERENCE}$) of the reference crystal 92 is slightly different than that of the transducer crystal 16. For example, the reference crystal 92 in the exemplary embodiment has a resonant frequency that is 10 to 100 kHz above or below the resonant frequency of the transducer crystal. In the preferred embodiment, the third harmonic of the resonant frequency of the reference crystal is 15.1 MHz. However, alternatively the two crystals may have the same resonant frequency and thus produce the same harmonic frequencies at zero torque conditions.

The outputs 92 and 98 of the two oscillators 47 and 90 are connected to the inputs of a mixer circuit 100, in which the two signals heterodyne. Heterodyning the two oscillator signals produces various combinations of those signals are produced on an output line 102 from the mixer. The processor 45 utilizes only the difference between the two oscillator frequencies that results from the heterodyning, and thus the output 102 is connected to a low pass filter 104 to remove, by attenuation, all frequency components at the output which are above 150 kHz in the present example. The resultant signal appears at node 106. The change in the frequency of the transducer crystal becomes a greater percentage of the heterodyned frequency than that of the fundamental frequency produced by the crystal. That characteristic of the present processor circuit increases the sensitivity of the torque sensing.

For example, if torque is not being applied to the torsion member 10 and discounting any environmental effects on the crystals 16 and 92, the output signals from the two oscillators 47 and 90 will be at the third harmonics of the crystals' nominal resonant frequencies of the two crystals, e.g. 15 MHz and 15.1 MHz. As a consequence, the signal at node 106 will have a frequency of 100 kHz, which is the difference between the two nominal resonant frequencies of the crystals. As torque is exerted on the torsion member 10, the resonant frequency of the transducer crystal 16 changes in direction above or below the nominal resonant frequency which corresponds to the direction of the applied torque, and by an amount that corresponds to the magnitude of the applied torque. Therefore, the frequency of the signal at node 106 varies from the nominal 100 kHz frequency in a direction and an amount that indicates the characteristics of the torque applied to the torsion member 10. In the exemplary circuit, the signal at node 106 varies bewtween 94 kHz and 106 kHz.

Changes in the environmental conditions affect both crystals 16 and 92 equally and are nullified by the heterodyne operation. Heterodyning also reduces the signal being processed to the kilohertz range, rather than the megahertz range of the oscillators. This frequency reduction simplifies the signal processing.

The signal at node 106 is then applied to a shaping circuit 108 which converts the signal into a square waveform having a frequency that corresponds to the torque. The resultant square wave signal is applied to an output terminal 110.

The output signal at terminal 110 can be processed further by a frequency to torque converter 112 to produce an actual value for the torque being applied to the torsion member 10. Any of several techniques can be used for that conversion of the frequency of the output signal to a torque value. For example, the output signal can be fed to a digital frequency counter controlled by a microcomputer. The digital output of the frequency counter then is used as an address for a look-up table which produces the corresponding torque value. Alternatively, the output signal as terminal 110 also can applied to a frequency-to-voltage converter to provide an analog output having a voltage level corresponding to the sensed torque.

We claim:

1. An apparatus for measuring torque in a torsion member, that apparatus comprising:

a transducer adapted to be attached to the torsion member and having a first resonant frequency which changes with variation of strain in the torsion member;

a transducer oscillator connected to the transducer and producing a first signal having a first frequency that is a function of the first resonant frequency;

a reference element having a second resonant frequency that is unaffected by variation of strain in the torsion member;

a reference oscillator connected to the reference element and producing a second signal having a second frequency that is a function of the second resonant frequency; and a mixer connected to the transducer oscillator and to the reference oscillator to heterodyne the first signal and second signal thereby producing a resultant signal having a frequency which corresponds to torque applied to in the torsion member.

2. The apparatus as recited in claim 1 further comprising a converter for producing a torque value from the frequency of the resultant signal.

3. The apparatus as recited in claim 1 wherein the transducer comprises a first piezoelectric crystal.

4. The apparatus as recited in claim 1 wherein the reference oscillator comprises a second piezoelectric crystal.

5. The apparatus as recited in claim 1 wherein the first resonant frequency is equal to the second resonant frequency.

6. The apparatus as recited in claim 1 wherein the first resonant frequency is unequal to the second resonant frequency.

7. The apparatus as recited in claim 1 wherein the first frequency is a harmonic of the first resonant frequency, and the second frequency is a harmonic of the second resonant frequency.

8. The apparatus as recited in claim 1 wherein the first frequency is a third harmonic of the first resonant frequency, and the second frequency is a third harmonic of the second resonant frequency.

9. The apparatus recited in claim 1 further comprising a filter connected to the mixer to limit the resultant signal to a predefined range of frequencies.

10. The apparatus recited in claim 1 further comprising a low pass filter connected to the mixer to limit the resultant signal to having a frequency corresponding to a difference between the first frequency and the second frequency.

11. The apparatus as recited in claim 1 further comprising a pair of capacitive couplers connecting the transducer to the transducer oscillator.

12. The apparatus as recited in claim 11 wherein each capacitive coupler comprises:

a plurality of disks attached to the torsion member in a spaced apart manner, each disk having a first major surface with a first electrically conductive region and a second major surface with a second electrically conductive region major surface connected to the first electrically conductive region; and a plurality of stationary plates interleaved with the plurality of disks, and each stationary plate having two major surfaces and an electrical conductor on each major surface.

13. The apparatus as recited in claim 12 wherein the first and second electrically conductive regions on each of the plurality of disks and the electrical conductor on the major surfaces of each plurality of stationary plates being covered by a coating of electrically insulating material.

14. The apparatus as recited in claim 1 further comprising:

a triaxial cable having a center conductor coupling the transducer to the transducer oscillator, an inner shield around the center conductor, and an outer shield around the inner shield and coupling the transducer to the transducer oscillator; and an amplifier having an input coupled to the center conductor and having an output connected to the inner shield.

15. A method for measuring torque in a torsion member, that method comprising:

attaching a transducer to the torsion member wherein the transducer has a first resonant frequency which varies with variation of strain in the torsion member;

exciting the transducer as part of a transducer oscillator to produce a first signal having a first frequency that is a function of the first resonant frequency;

driving a reference oscillator to produce a second signal having a second frequency that is unaffected by variation of strain in the torsion member; and a heterodyning the first signal and second signal thereby producing a resultant signal having a frequency that indicates the torque in the torsion member.

16. The method as recited in claim 15 wherein attaching a transducer comprises attaching a piezoelectric element to the torsion member.

17. The method as recited in claim 16 wherein driving a reference oscillator comprises exciting another piezoelectric element that is remote from the torsion member.

18. The method as recited in claim 15 wherein exciting the transducer produces the first signal so that the first frequency is a harmonic of the first resonant frequency.

19. The method as recited in claim 15 further comprising low pass filtering the resultant signal to produce a filtered signal having a frequency that corresponds to a difference in the first frequency and the second frequency.

* * * * *

UNITED STATES PATENT AND TRADEMARK OFFICE
CERTIFICATE OF CORRECTION

PATENT NO.    : 6,581,478 B2
DATED         : June 24, 2003
INVENTOR(S)   : Birger Pahl et al.

It is certified that error appears in the above-identified patent and that said Letters Patent is hereby corrected as shown below:

<u>Column 5,</u>
Line 37, after "member" insert -- 10. In that case, a connection utilizing a triaxial cable and a nulling circuit will be used to connect the reference crystal 92 to the oscillator circuit 90, just as for the transducer oscillator circuit 47. --

Signed and Sealed this

Twenty-fifth Day of November, 2003

JAMES E. ROGAN
*Director of the United States Patent and Trademark Office*